(12) United States Patent
Strock

(10) Patent No.: US 11,131,206 B2
(45) Date of Patent: Sep. 28, 2021

(54) SUBSTRATE EDGE CONFIGURATIONS FOR CERAMIC COATINGS

(71) Applicant: United Technologies Corporation, Farmington, CT (US)

(72) Inventor: Christopher W. Strock, Kennebunk, ME (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

(21) Appl. No.: 16/184,108

(22) Filed: Nov. 8, 2018

(65) Prior Publication Data

US 2020/0149426 A1    May 14, 2020

(51) Int. Cl.
*B22F 5/00* (2006.01)
*F01D 11/12* (2006.01)

(52) U.S. Cl.
CPC ........ *F01D 11/122* (2013.01); *F05D 2230/90* (2013.01); *F05D 2240/11* (2013.01); *F05D 2240/55* (2013.01); *F05D 2300/2285* (2013.01); *F05D 2300/6033* (2013.01); *F05D 2300/611* (2013.01)

(58) Field of Classification Search
None
See application file for complete search history.

(56) References Cited

U.S. PATENT DOCUMENTS

| | | | |
|---|---|---|---|
| 6,158,961 A * | 12/2000 | Kehl | F01D 5/141 29/527.6 |
| 8,506,243 B2 | 8/2013 | Strock et al. | |
| 2003/0175116 A1 * | 9/2003 | Le Biez | F01D 11/122 415/173.4 |
| 2009/0136345 A1 * | 5/2009 | Tholen | F01D 11/125 415/230 |
| 2015/0198053 A1 * | 7/2015 | Kim | F01D 11/02 415/207 |
| 2016/0003087 A1 | 1/2016 | Farris et al. | |
| 2016/0040548 A1 * | 2/2016 | Paulino | F01D 11/122 415/173.1 |
| 2016/0040551 A1 | 2/2016 | Strock et al. | |
| 2016/0047264 A1 | 2/2016 | Joe et al. | |
| 2016/0236995 A1 * | 8/2016 | Lai | C04B 37/005 |
| 2016/0251970 A1 | 9/2016 | Strock et al. | |
| 2017/0254220 A1 | 9/2017 | Hillier | |

(Continued)

FOREIGN PATENT DOCUMENTS

EP    2034132 A2    3/2009

OTHER PUBLICATIONS

Merriam-Webster Dictionary, "Definition of Registry by Merriam-Webster", accessed Mar. 23, 2020 at merriam-webster.com/dictionary/registry, 10 pages. (Year: 2020).*

(Continued)

*Primary Examiner* — Humera N. Sheikh
*Assistant Examiner* — Kim S. Horger
(74) *Attorney, Agent, or Firm* — Bachman & LaPointe, P.C.

(57) ABSTRACT

An article has a body having: a first face; and a first bevel surface extending from the first face. A plurality of first channels along the first bevel surface extending from the first face. A ceramic coating is along the inner diameter surface and the first bevel surface.

16 Claims, 6 Drawing Sheets

(56) References Cited

U.S. PATENT DOCUMENTS

2017/0370240 A1 12/2017 Sippel et al.
2019/0195080 A1 6/2019 Paulino et al.

OTHER PUBLICATIONS

Fouser, "Housing", Jul. 8, 2016, Korea.net, 2 pages. Accessed online at www.korea.net/AboutKorea/Korean-Life/Housing on Aug. 19, 2020. (Year: 2016).*
European Search Report dated Jan. 31, 2020 for European Patent Application No. 19208107.3.

* cited by examiner

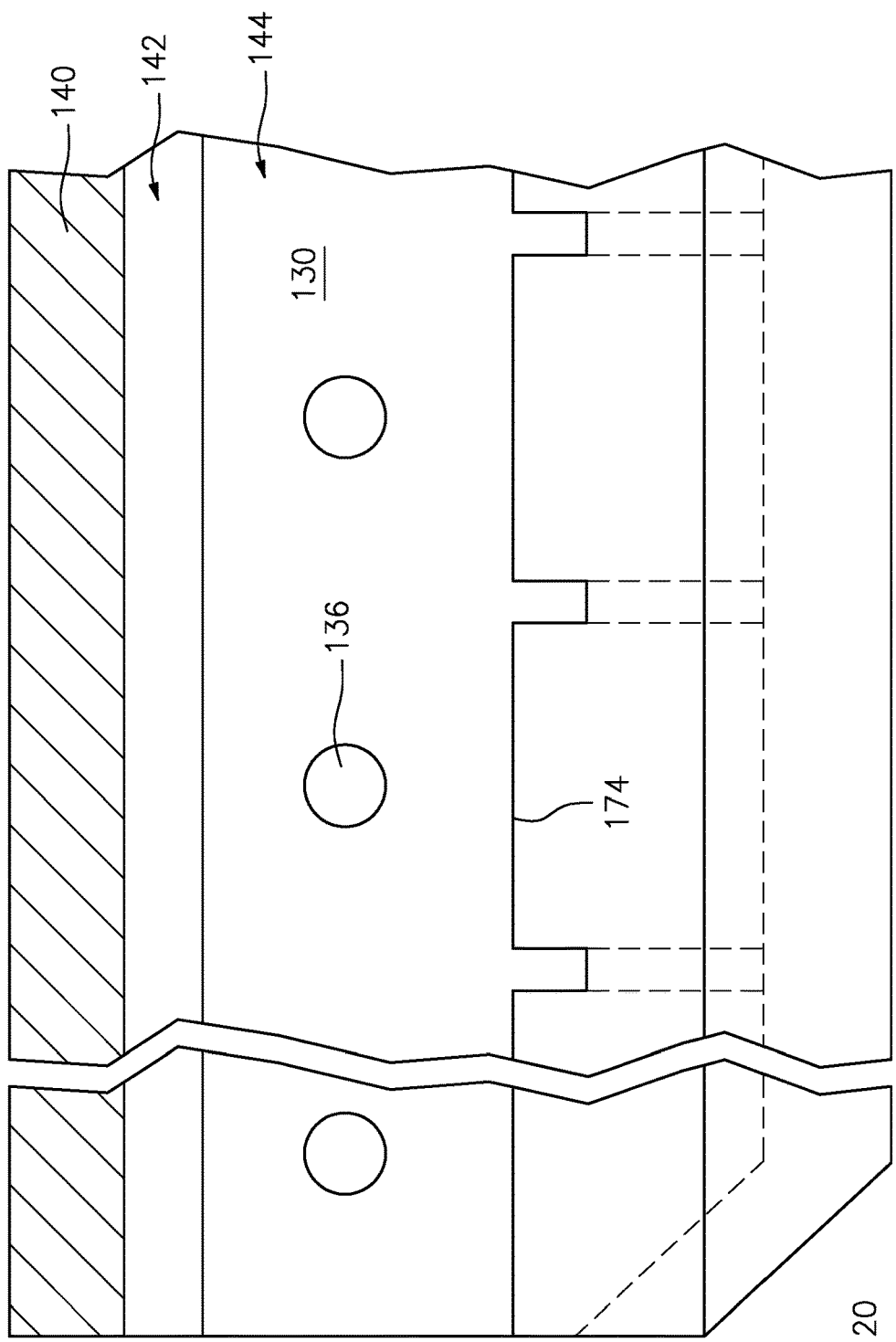
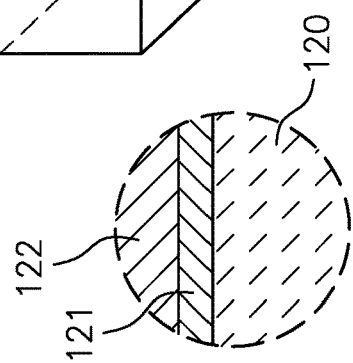
FIG. 4A
FIG. 5

SUBSTRATE EDGE CONFIGURATIONS FOR CERAMIC COATINGS

BACKGROUND

The disclosure relates to ceramic coatings for gas turbine engines. More particularly, the disclosure relates to coating and substrate edge conditions.

Ceramic coatings are used for several purposes in modern gas turbine engines (broadly inclusive of turbofans, turbojets, turboprops, turboshafts, and industrial gas turbines). Key purposes include being barrier coatings (environmental (EBC) and/or thermal (TBC)) and abradable coatings (e.g., in sliding engagement with an abrading member). Exemplary abradable coatings are used on the gaspath-facing inner diameter (ID) surface of blade outer air seals (BOAS) in circumferential sliding engagement with blade tips (e.g., airfoil tips or tip shrouds).

Other locations for abradable coatings include rotor-to-stator interactions other than at blade tips. One example involves sealing between an inter-blade stage area of a rotor and inner diameter (ID) tips of stator airfoils or inner diameter sealing surfaces of ID shrouds of vanes.

Delamination or spalling of thermal barrier coatings from their underlying substrates is a significant problem. A principal driver of delamination is differential thermal expansion/contraction of the coating and the underlying substrate. This can be exacerbated by coating contamination such as calcium magnesium alumino-silicate (CMAS) attack, also known as molten sand attack. CMAS attack reduces the ability of the coating to accommodate differential thermal expansion.

U.S. Pat. No. 8,506,243, Strock et al., Aug. 13, 2013, "Segmented thermally insulating coating" (the '243 patent), discloses combatting spalling of ceramic coatings via creation of faults to accommodate thermal deformations. To initiate the faults, the substrate is provided with an array of recesses along the region to be coated. The boundaries between recessed and unrecessed surface provide initiation sites for the faults. With typical plasma spray coatings, the initiation may be the creation of boundaries/gaps between regions of the as-applied coating.

United States Patent Application Publication 20160251970A1, Strock et al., Sep. 1, 2016, "SEGMENTED CERAMIC COATING INTERLAYER" (the '970 publication), discloses further use of a ceramic interlayer.

United States Patent Application Publication 20160003087A1, Farris et al., Jan. 7, 2016, "EDGE TREATMENT FOR GAS TURBINE ENGINE COMPONENT" (the '087 publication), discusses the particular problems of spallation at coating edges. A particular example is at the circumferential (circumferential end) edges of BOAS segments.

SUMMARY

One aspect of the disclosure involves an article comprising a body having a first face and a first bevel surface extending from the first face. A plurality of first channels are along the first bevel surface extending from the first face. A ceramic coating is along the first face and the first bevel surface.

A further embodiment of any of the foregoing embodiments may additionally and/or alternatively include the article being a gas turbine engine component.

A further embodiment of any of the foregoing embodiments may additionally and/or alternatively include the ceramic coating comprising a stabilized zirconia.

A further embodiment of any of the foregoing embodiments may additionally and/or alternatively include the body being metallic.

A further embodiment of any of the foregoing embodiments may additionally and/or alternatively include the body comprising a metallic substrate and a metallic bondcoat.

A further embodiment of any of the foregoing embodiments may additionally and/or alternatively include the metallic substrate being a nickel-based superalloy and the ceramic coating comprising a stabilized zirconia.

A further embodiment of any of the foregoing embodiments may additionally and/or alternatively include the body having a plurality of first recesses in a pattern along the first face. The first channels comprise a first group of channels and a second group of channels. The channels of the first group are of different size than the channels of the second group. The channels of the first group are of different registry with the pattern than are the channels of the second group.

A further embodiment of any of the foregoing embodiments may additionally and/or alternatively include the pattern being a hexagonal array and the hexagonal array having a first row along the first bevel surface. The channels of the first group are longer than the channels of the second group. The channels of the first group are in-phase with the recesses of the first row. The channels of the second group are out-of-phase with the recesses of the first row.

A further embodiment of any of the foregoing embodiments may additionally and/or alternatively include the article being a blade outer airseal wherein: the first face is a transversely concave inner diameter surface. The body comprises: a first circumferential end; a second circumferential end; a first axial end; a second axial end. Said first bevel is between the first circumferential end and the inner diameter surface. A second bevel is between the second circumferential end and the inner diameter surface. Said plurality of first channels along the first bevel extend from the inner diameter surface to the first circumferential end. A plurality of second channels along the second bevel extend from the inner diameter surface to the second circumferential end. Said ceramic coating is along the inner diameter surface, the first bevel surface, and the second bevel surface.

A further embodiment of any of the foregoing embodiments may additionally and/or alternatively include the body having a plurality of first recesses along the inner diameter surface.

A further embodiment of any of the foregoing embodiments may additionally and/or alternatively include the ceramic having a by weight majority of at least one of YSZ and GSZ.

A further embodiment of any of the foregoing embodiments may additionally and/or alternatively include a gas turbine engine including a plurality of the articles in a circumferential array.

A further embodiment of any of the foregoing embodiments may additionally and/or alternatively include the gas turbine engine further comprising a blade stage encircled by the circumferential array.

A further embodiment of any of the foregoing embodiments may additionally and/or alternatively include the gas turbine engine having a gaspath. The first bevel is at an upstream end of the body along the gaspath.

A further embodiment of any of the foregoing embodiments may additionally and/or alternatively include the first bevel being at first circumferential end of the body. The body has a second circumferential end and a second bevel extending from the first face to the second circumferential end.

A further embodiment of any of the foregoing embodiments may additionally and/or alternatively include a method for manufacturing the article. The method comprises machining the first channels in the body and applying the coating.

A further embodiment of any of the foregoing embodiments may additionally and/or alternatively include grinding the coating to remove artifacts of the first channels.

A further embodiment of any of the foregoing embodiments may additionally and/or alternatively include machining each of the first channels by: plunging a rotating bit into the first surface; and drawing the rotating bit down the bevel surface.

A further embodiment of any of the foregoing embodiments may additionally and/or alternatively include the machining each of the first channels further comprising, between the plunging and the drawing, turning the bit transverse to its rotation.

Another aspect of the disclosure involves a blade outer airseal comprising a body having: a transversely concave inner diameter surface; a first circumferential end; a second circumferential end; a first axial end; a second axial end; a first bevel between the first circumferential end and the inner diameter surface; a second bevel between the second circumferential end and the inner diameter surface. A plurality of first recesses are along the inner diameter surface. A plurality of first channels are along the first bevel extend from the inner diameter surface to the first circumferential end. A plurality of second channels along the second bevel extend from the inner diameter surface to the second circumferential end. A ceramic coating is along the inner diameter surface, the first bevel surface, and the second bevel surface.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 4A is an enlarged view of a portion of FIG. 4.

FIG. 5 is a cross-sectional view of the FIG. 4 junction at line 5-5 of FIG. 4.

Like reference numbers and designations in the various drawings indicate like elements.

DETAILED DESCRIPTION

BOAS inter-segment edges are an area of high temperature and resultant high coating spallation due to several factors: the edges are free and exposed to heat on two sides; blade passage causes disruption of film cooling; pressure fluctuations associated with blade passage may cause hot gasses to pump in and out of intersegment gaps; and the 90° edge creates stress concentration. Various implementations disclosed below may addresses one or more of heat transfer, tolerance to thermally induced sintering shrinkage and the stress concentrations.

Figure 1:
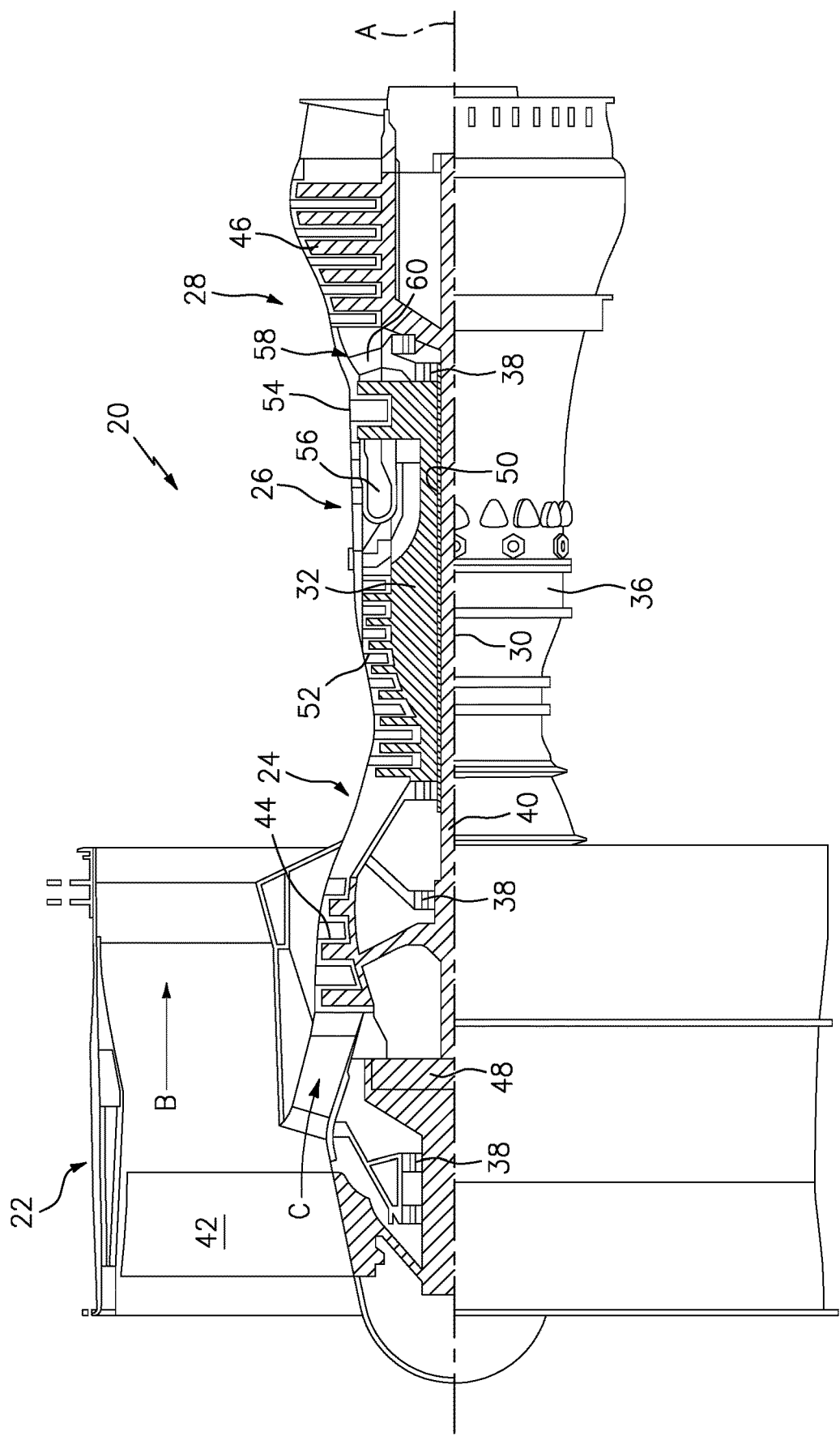
FIG. 1 is a schematic, half cross-sectional, view of a gas turbine engine.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to the combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines such as turbojets, turboprops, turboshafts, and industrial gas turbines (IGT).

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The example engine is a geared turbofan where the inner shaft 40 drives the fan 42 through a speed change device, such as a geared architecture 48 (e.g., epicyclic transmission), to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

The combustion section 26 comprises a combustor 56 between the high pressure compressor 52 and the high pressure turbine 54. The example combustor is an annular combustor. Alternative combustors include can-type combustor arrays. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

A mid-turbine frame 58 of the engine static structure 36 is generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44, then by the high pressure compressor 52, mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

Figure 2:
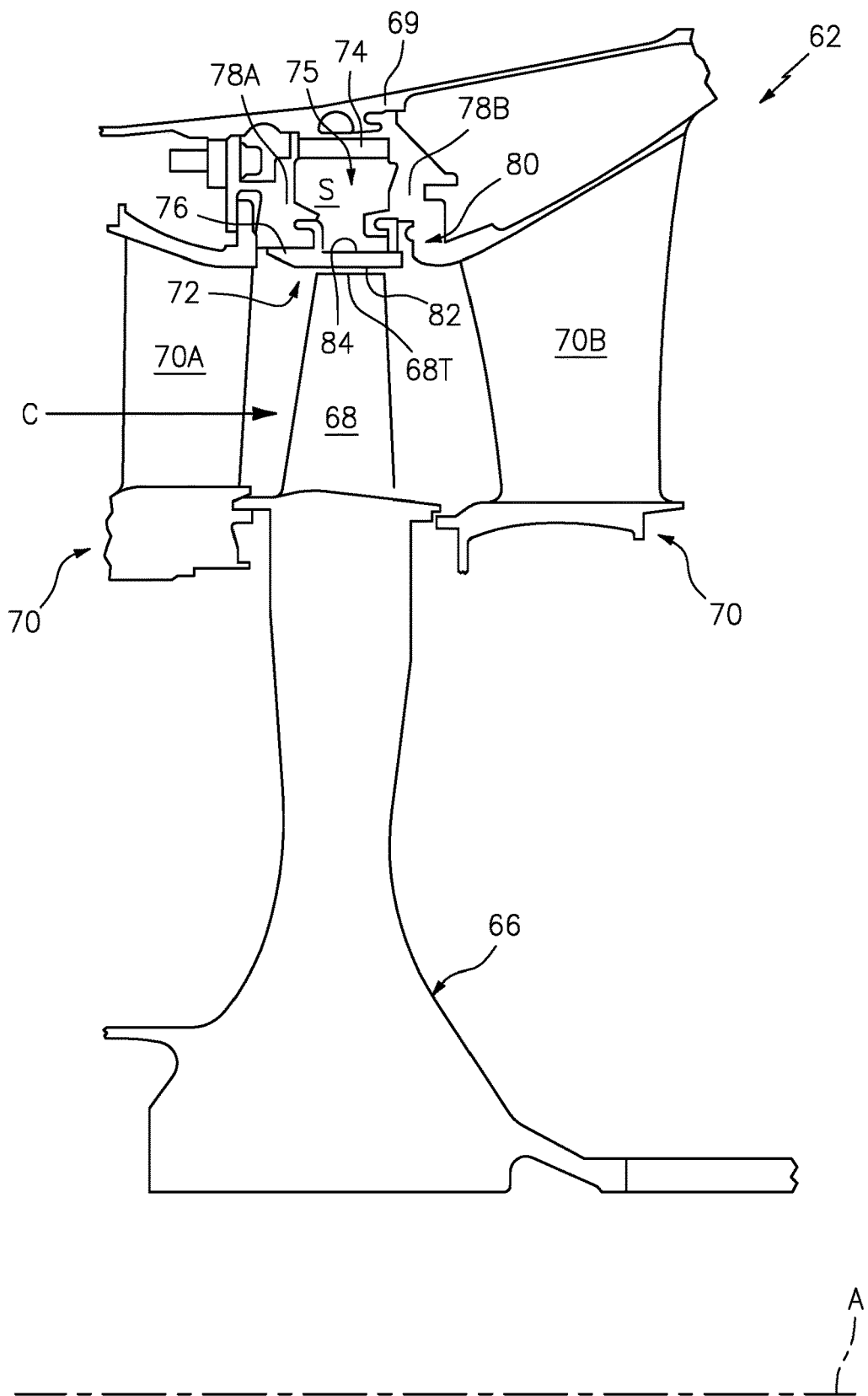
FIG. 2 is a cross-section view of a portion of a gas turbine engine.

FIG. 2 illustrates a portion 62 of a gas turbine engine, such as the gas turbine engine 20 of FIG. 1. In this exemplary embodiment, the portion 62 represents the high pressure turbine 54. However, it should be understood that other portions of the gas turbine engine 20 could benefit from the teachings of this disclosure, including but not limited to, the compressor section 24, the combustor section 26, and the low pressure turbine 46.

In this exemplary embodiment, a rotor disk 66 (only one shown, although multiple disks could be axially disposed within the portion 62) is mounted to the outer shaft 50 and rotates as a unit with respect to the engine static structure 36. The portion 62 includes alternating rows of rotating blades 68 (mounted to the rotor disk 66) and vanes 70A and 70B of vane assemblies 70 that are also supported within an outer casing 69 of the engine static structure 36.

Each blade 68 of the rotor disk 66 includes a blade tip 68T that is positioned at a radially outermost portion of the blades 68. The blade tip 68T extends toward a blade outer air seal (BOAS) assembly 72. The BOAS assembly 72 may find beneficial use in many industries including aerospace, industrial, electricity generation, naval propulsion, pumps for gas and oil transmission, aircraft propulsion, vehicle engines and stationery power plants.

The BOAS assembly 72 is disposed in an annulus radially between the outer casing 69 and the blade tip 68T. The BOAS assembly 72 generally includes a support structure 74 and a multitude of BOAS segments 76 (only one shown in FIG. 2). The BOAS segments 76 may form a full ring hoop assembly that encircles associated blades 68 of a stage of the portion 62. The support structure 74 is mounted radially inward from the outer casing 69 and includes forward and aft flanges 78A, 78B that mountably receive the BOAS segments 76. The forward flange 78A and the aft flange 78B may be manufactured of a metallic alloy material and may be circumferentially segmented for the receipt of the BOAS segments 76.

The support structure 74 may establish a cavity 75 that extends axially between the forward flange 78A and the aft flange 78B and radially between the outer casing 69 and the BOAS segment 76. A secondary cooling airflow S may be communicated into the cavity 75 to provide a dedicated source of cooling airflow for cooling the BOAS segments 76. The secondary cooling airflow S can be sourced from the high pressure compressor 52 or any other upstream portion of the gas turbine engine 20.

Figure 3:
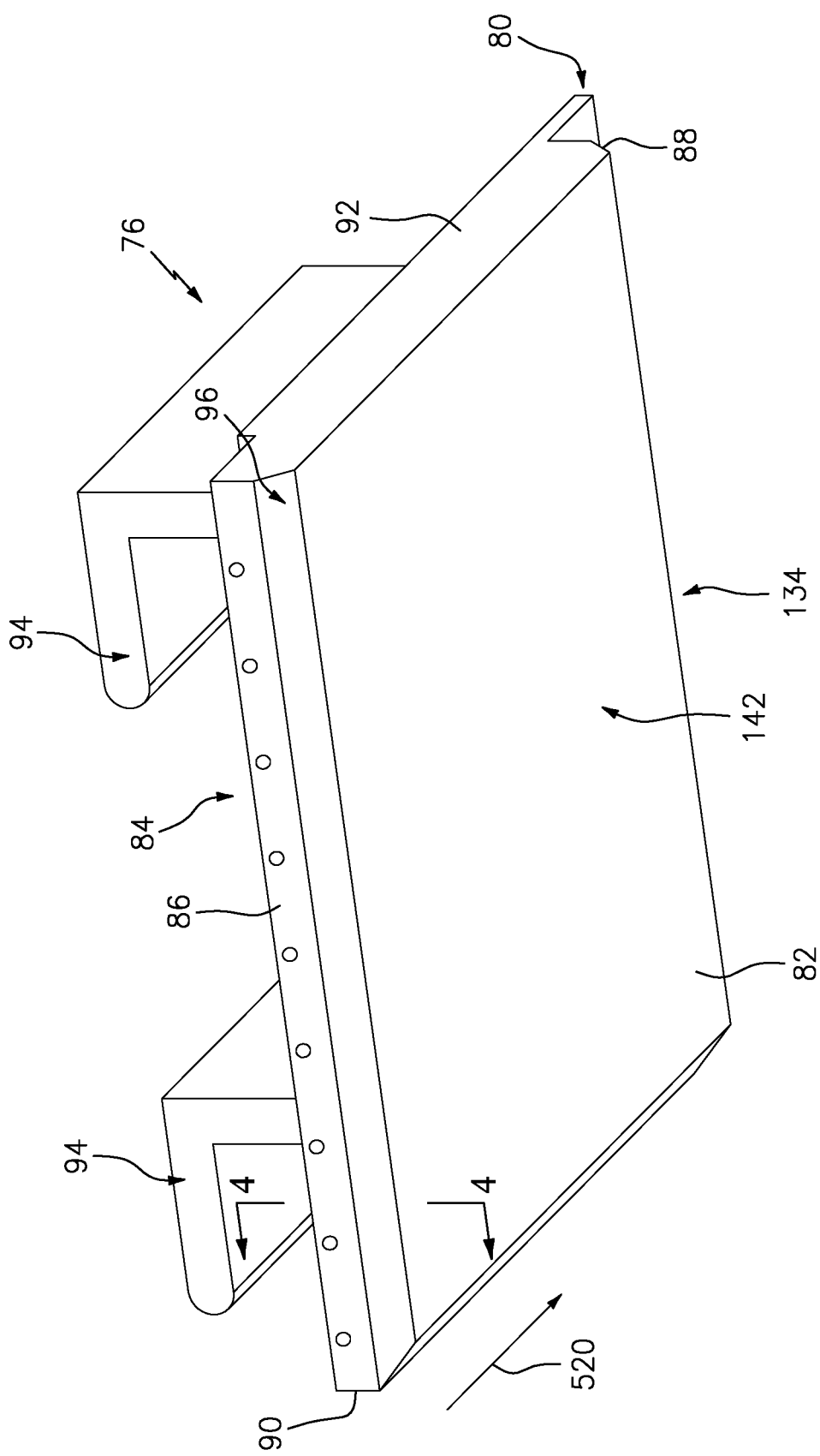
FIG. 3 is a view of a blade outer air seal (BOAS) segment.
Figure 4:
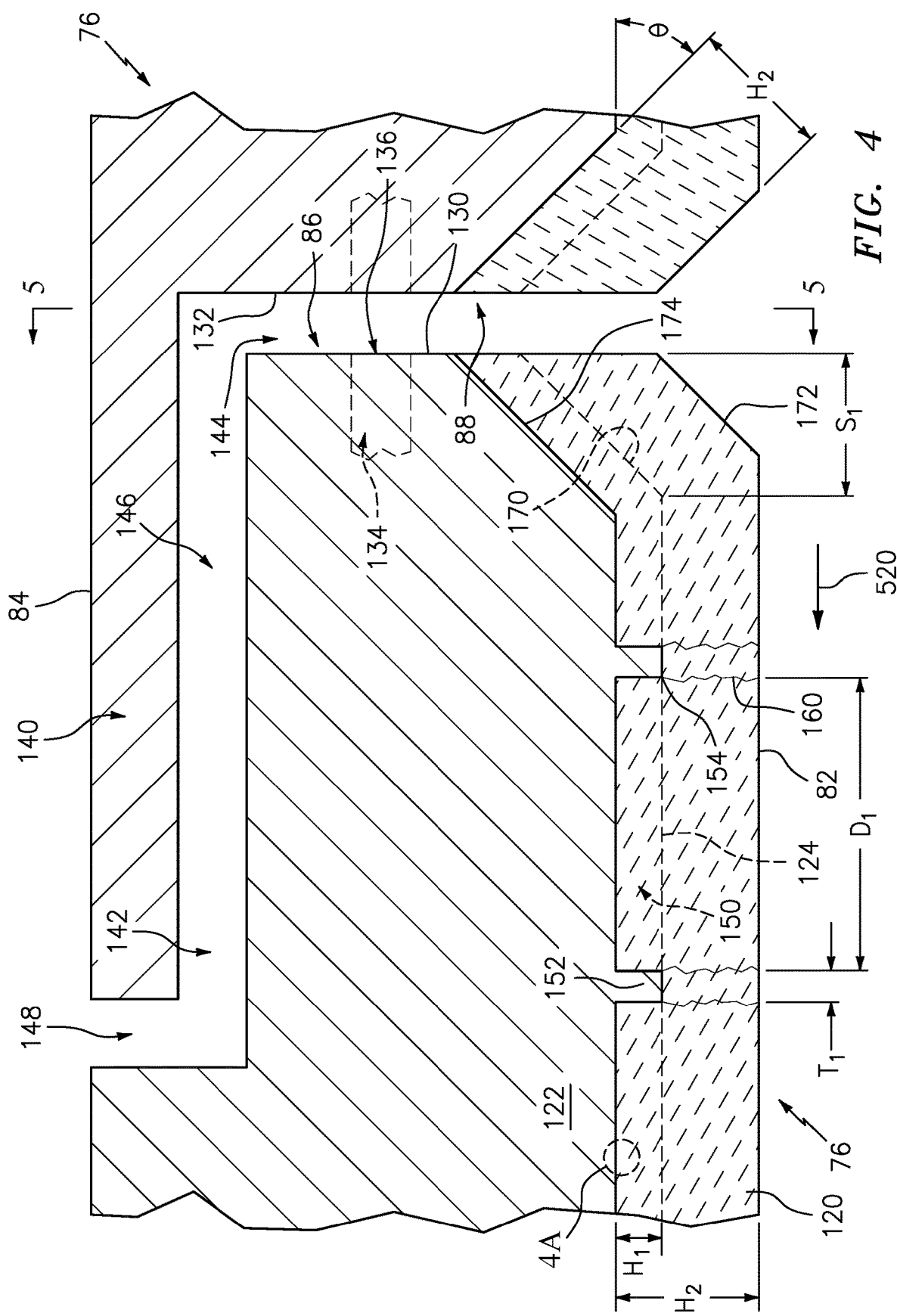
FIG. 4 is a cross-sectional view of a junction of a pair of BOAS of FIG. 3 at line 4-4 of FIG. 3.

FIGS. 3 to 5 illustrate one exemplary embodiment of a BOAS segment 76 that may be incorporated into a gas turbine engine, such as the gas turbine engine 20. The BOAS segment 76 is an example type of gas turbine engine component. Portions of the BOAS segment 76 includes areas that are exposed to high temperature and other relatively harsh conditions.

Other types of gas turbine engine components face similar harsh conditions. Such components may include vane and blade platforms, burner liner segments, fuel nozzle guides, bulkhead segments, combustors, etc. Although the examples of this disclosure are described with reference to the BOAS segment 76, the other types of gas turbine engine components could also benefit from the teachings of this disclosure, particularly those components having ceramic coating such as thermal barrier coatings and abradable coatings.

The BOAS segment 76 may include a seal body 80 having a radially inner face 82 (or faces) that faces toward the blade tip 68T a radially outer face 84 (or faces) that faces toward the cavity 75 (See FIG. 2). The radially inner face 82 (inboard or inner diameter (ID)) and the radially outer face 84 (outboard or outer diameter (OD)) circumferentially extend between a first mate face (circumferential end) 86 and a second mate face (circumferential end) 88 and axially extend between a leading edge face or end 90 and a trailing edge face or end 92. A pair of fore-and-aft mounting lugs 94 extend outward from the outer face 84.

The first mate face 86 meets the radially inner face 82 at an intersection 96. There are similar intersections or junctions between the radial interface and the mate face 86, leading edge face 90, and trailing edge face 92. However, the interaction of the blades make the intersection 96 particularly relevant. As is discussed below, the intersection includes a bevel rather than reflecting a right angle intersection of substrate surfaces. FIG. 3 shows a blade sweep direction 520. Thus, there may be the highest contact forces as the blade tips first contact the inner face 82 at the intersection 96. This may present some of the highest mechanical forces and shocks. Nevertheless, other locations are relevant. For example, near the leading end there are mechanical forces associated with the impingement of the gas flow including any particulate therein. At the intersection of the inner face with the second mate face 88, there are kinetics associated with the releasing of the force from blade tip contact as the blade tip passes out of engagement with one segment and into engagement with the next segment.

FIG. 4 shows an intersection between two adjacent BOAS segments 76. FIG. 4 shows a ceramic abradable coating system 120 atop a metallic substrate 122. The exemplary substrate material is nickel-based superalloy. Although the exemplary coating is shown as a single ceramic layer, there may be multiple ceramic layers. Additionally, there may be a bondcoat 121 (FIG. 4A, e.g., an MCrAlY (e.g., NiCoCrAlY applied such as by physical vapor deposition (PVD) or thermal spray (e.g., high velocity air fuel (HVAF)), an aluminide (e.g. a platinum aluminide applied such as by plating platinum and spraying or packing aluminum followed by diffusion), or the like) atop the substrate as well as a thermally grown oxide, diffusion zone, or the like. Exemplary ceramic coatings are stabilized zirconias such as yttria stabilized zirconias (YSZ) and gadolinia stabilized zirconias (GSZ) or combinations.

The ID surface of the ceramic 120 provides the inner face 82 of the overall blade outer air seal. The substrate 122 has a corresponding ID face 124. In general, the segment and the substrate may have corresponding portions with the corresponding portions being one in the same except along the coated areas. However, areas of the segment not covered by ceramic coating may be covered by some other coating such as for corrosion protection. Typically, these other coatings are much thinner than the ceramic coatings. Exemplary such other coatings include chromium conversion coatings.

FIG. 4 shows first and second circumferential end faces 130 and 132 of the substrate along the corresponding mate faces 86 and 88 of the overall segment. Cooling passages 134 may have outlets 136 (FIG. 5) to these surfaces. The cooling passages may be fed from bypass air introduced through the radially outer face 84 by conventional means (not shown).

As one example of an interaction between adjacent segments, the substrates have a ship lap junction formed by a circumferential OD protrusion 140 from the second mate face 88 accommodated in an OD relief 142 extending from the first mate face of the adjacent segment. The interaction leaves a gap having a first (inner) radial segment 144, a circumferential segment 146, and a second (outer) radial segment 148.

To help avoid spalling, the ID face 124 of the substrate is provided with an array of recesses 150 such as in the '243 patent. The recessing leaves intact protruding material 152 of the substrate between recesses. Exemplary recesses are principally machined circular recesses (e.g., flat bottomed, such as by a plunge end milling) in a regular array (e.g., a square array or a hexagonal array). As in the '243 patent, the boundaries 154 between recesses serve as initiation sites for faults 160 in the ceramic coating which help isolate and accommodate stresses. For non-intersecting recesses 150, the protruding material 152 is continuous encircling the recesses (e.g., circular recesses have an on-center spacing greater than their diameter).

Unlike in the '243 patent, the recessing extends to and is modified along the edges of the coated substrate region. In the illustrated example, these edges are at the leading end 90 and circumferential ends (mate faces) 86 and 88. FIG. 4 shows the substrate 122 as having an edge bevel or chamfer having a surface 170 (extending to the mate face 86) and the coating having a corresponding bevel or chamfer having a surface 172. Additionally, the recessing extends as channels (discussed below) along the bevel with a recess base 174 (also see FIG. 5) shown. FIG. 4 shows the adjacent segment having a similar bevel with similar recesses/channels at its mate face 88.

Figure 6:
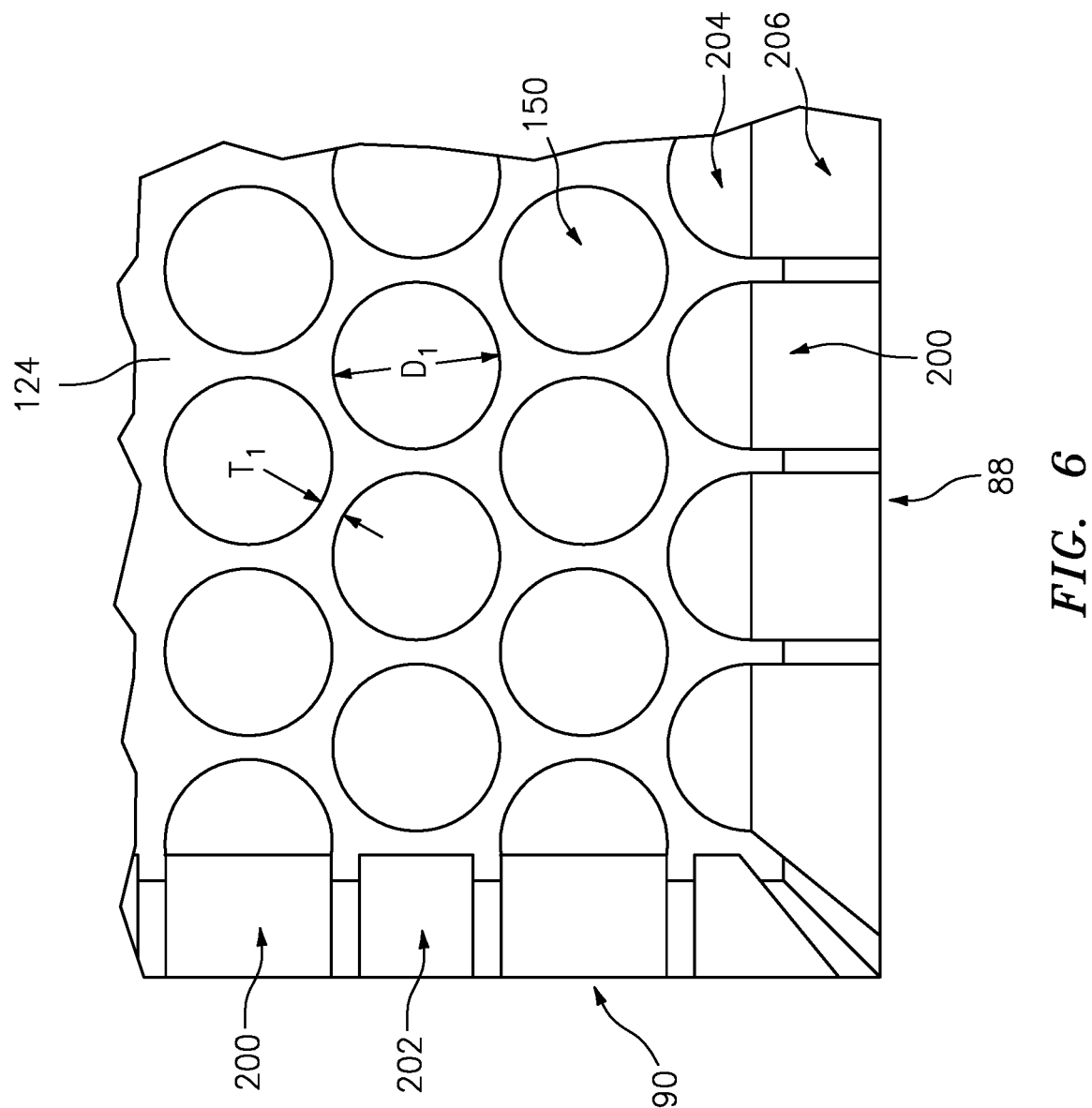
FIG. 6 is a partial plan view of an inner diameter (ID) face of a BOAS.

FIG. 6 shows an exemplary patterning of recesses 150 along the ID face 124 or underside. The recesses 150 are shown as circular having diameter $D_1$ and in a hexagonal array leaving a thickness $T_1$ of intact substrate material at the location of minimum thickness. FIG. 4 further shows a recess 150 depth or height of the protruding material as $H_1$ and an overall coating thickness measured from recess bases of $H_2$. The substrate bevel 170 on the intact substrate material (as opposed to recess/channel base 174) has a span $S_1$. The corresponding recess base 174 may have a slightly larger span as is reflected, for example, in FIG. 4. The coating bevel 172 may be approximately the same size as $S_1$ or may be larger or smaller.

FIG. 6 shows one aspect of the hexagonal array when applied to a surface having a right angle corner between adjacent edges or ends (a corner region between the leading end 90 and the mate face 88 being shown). In this example, a main direction of the array of recesses 150 is parallel to one edge while a secondary direction is parallel to the other. The recesses along the bevels may thus be different for the two edges 90 and 88.

FIG. 6 shows a plurality of a first form of channels or recesses 200 side-by-side along the edge (e.g., mate face 88) aligned with the main direction. FIG. 6 further shows a combination of such recesses 200 and a plurality of a second form of channels or recesses 202 along the edge (e.g., leading end 90) aligned with the secondary direction. The recesses 200 may comprise the combination of an intact portion 204 of a circular recess in the array of recesses 150 and a portion 206 from bevel to edge (thus open to the edge (mate face or leading end) to form a channel). In one example using a plunge end mill, the end mill is plunged in to form the portion 204 then tilted to rotate its axis normal to the axis and then translated toward and past the edge to form the section 206.

Along the secondary direction of the hexagonal pattern, smaller quill or bit may be used to machine the recesses 202 (thus also forming a channel open at the leading end). Thus, with the portions 204 forming a leading row of the hexagonal array, the relative registry places the channels 200 in phase with that row and the channels 202 out of phase with that row. Given the phase relationship of the two rows, the channels 202 may thus be formed merely by a translation parallel to the bevel surface.

An exemplary manufacture process may modify any appropriate existing or yet-developed baseline process. The substrate may be formed by conventional techniques (e.g., investment casting over casting cores (if any) followed by deshelling/decoring and finish machining). The finish machining may leave reference surfaces for the subsequent machining of the recesses as discussed above. After recess machining, bondcoat (if any) may be applied via appropriate techniques including physical vapor deposition. The bondcoat (e.g., metallic), if any, may be applied/formed by conventional techniques.

The ceramic coating may then be applied via vapor deposition and/or spray (as noted above multiple layer coatings are possible). One area of examples involves a pure spray application (e.g., air plasma spray). Alternative spray techniques include high velocity oxy-fuel (HVOF) and flame spray. The spray application may leave excess coating material in order to guarantee sufficient ultimate thickness along the recesses. Thus, after coating application, the recesses may print through to the surface of the as-applied coating. The coating may then, however, be ground down to a smooth contour eliminating any valleys associated with the recesses but leaving the faults.

Returning to FIG. 6, the bevel width or span $S_1$ is on the order of the size of the recesses (e.g., between the thickness $T_1$ and $2D_1$, more narrowly between $T_1$ and $T_1+D_1$. For typical aircraft engines, exemplary $T_1$ is 10 mil to 50 mil (0.25 mm to 1.3 mm), more narrowly 15 mil to 30 mil (0.38 mm to 0.76 mm). Exemplary $D_1$ is between 50 mil to 125 mil (1.3 mm to 3.2 mm), more narrowly 70 mil to 100 mil (1.8 mm to 2.5 mm). Exemplary $H_1$ 10 mil to 50 mil (0.25 mm to 1.3 mm), more narrowly 12 mil to 35 mil (0.30 mm to 0.89 mm) or 15 mil to 25 mil (0.38 mm to 0.64 mm). For very thick coatings such as in large applications like industrial gas turbines, these could be magnified by a factor of three. An exemplary bevel angle θ is 20° to 70° off the ID face, more particularly, 30° to 60°.

The width $S_1$ is chosen to achieve coating thickness $H_2$ (along the bevel—FIG. 4) to width $S_1$ ratio of 1:3 to 1:1 which relieves some of the stress from sintering shrinkage and promotes spallation resistance and surface temperature capability. In some less demanding applications, the ratio of thickness $H_2$ to width $S_1$ may be as small as 1:5. To better illustrate features, FIG. 4 is not to scale/proportion. Also, although not shown, a further variation could extend the recesses radially farther along the unbeveled portions of the faces 130, 132 (particularly where those unbeveled portions also were coated). Also, in the illustrated FIG. 4 configuration, $H_2$ and $H_1$, measured normal to the actual surface (and not to the pre-bevel surface) are lower along the bevel than along unbeveled substrate. This is not required. They may be the same.

The pair of bevels brings TBC further radially outboard while beveling the square metallic edge which reduces heat load and base metal temperature and also reduces the temperature of the intersegment edge as the bevel helps to reduce hot gas impingement along the edges of the intersegment gap. The bevel also serves to reduce stress concentration by eliminating the square ground corners of TBC and base metal.

Further improvement in sintering tolerance is achieved by introducing linear features perpendicular to the chamfer in the form of the lateral boundaries of the recesses 200, 202. These boundaries initiate the faults 160 to provide ceramic segmentation and expansion joints in the ceramic layer. These faults act as an expansion joint to limit the transfer of stresses due to thermal expansion, sintering shrinkage, etc.

As noted above, depending on coating technique, these faults may be in the as-applied coating as non-crack regions of the coating structure where little or no strength has been developed in the planar directions. This is due to simultaneous deposition on the raised and recessed features which results in the lower coating regions building up alongside the raised regions where little to no bonding occurs. This low strength region acts as an expansion joint to achieve strain tolerance. In other examples (particularly physical vapor deposition (PVD) and suspension plasma spray (SPS)), the faults may form as cracks during thermal cycling after initial deposition.

As noted above, myriad variations are possible. Some variations include omitting the array of recesses 150 and only having recessing along the bevel. Other variations may extend an array of recesses only slightly inward along intact surface 124 but not along the entire footprint of the BOAS or other article.

Additional variations involve substrate and/or coating materials. Alternative substrates include ceramic matrix composites (CMC) such as SiC—SiC. These may favor alternative coatings such as those comprising (e.g., at least 50% by weight) one or more of hafnia, hafnium silicate and yttrium silicate.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline article configuration or use situation or coating composition/layering or process, details of such baseline may influence details of particular implementations. Accordingly, other embodiments are within the scope of the following claims.

What is claimed is:

1. A blade outer airseal comprising:
    a body having:
        a transversely concave inner diameter surface;
        a first circumferential end;
        a second circumferential end;
        a first axial end;
        a second axial end;
        a first bevel between the first circumferential end and the inner diameter surface;
        a second bevel between the second circumferential end and the inner diameter surface;
        a plurality of first recesses along the inner diameter surface;
        a plurality of first channels along the first bevel extending from the inner diameter surface to the first circumferential end, the first bevel extending continuously between the first channels; and
        a plurality of second channels along the second bevel extending from the inner diameter surface to the second circumferential end, the second bevel extending continuously between the second channels; and
    a ceramic coating along the inner diameter surface, the first bevel, and the second bevel.

2. The blade outer airseal of claim 1 wherein:
the ceramic coating comprises a stabilized zirconia.

3. The blade outer airseal of claim 1 wherein:
the body comprises a metallic substrate and a metallic bondcoat.

4. The blade outer airseal of claim 3 wherein:
the metallic substrate is a nickel-based superalloy; and
the ceramic coating comprises a stabilized zirconia.

5. The blade outer airseal of claim 1 wherein:
the ceramic coating has a by weight majority of at least one of yttria stabilized zirconia (YSZ) and gadolinia stabilized zirconia (GSZ).

6. The blade outer airseal of claim 1, wherein the body further comprises: A turbine engine component comprising:
    a leading bevel surface extending from the inner diameter surface to the first axial end; and
    a plurality of leading bevel surface first channels in the leading bevel surface extending from the inner diameter surface wherein:
        the ceramic coating is along the leading bevel surface and in the leading bevel surface first channels.

7. The blade outer airseal of claim 6 wherein:
the ceramic coating has a by weight majority of at least one of yttria stabilized zirconia (YSZ) and gadolinia stabilized zirconia (GSZ).

8. The blade outer airseal of claim 6 wherein:
the plurality of first recesses are in a pattern along the inner diameter surface;
the leading bevel surface first channels comprise a first group of channels and a second group of channels:
    the channels of the first group being of different size than the channels of the second group; and
    the channels of the first group being of different registry with the pattern than are the channels of the second group; and
the ceramic coating is in the first recesses.

9. The blade outer airseal of claim 8 wherein:
the pattern is a hexagonal array;
the hexagonal array has a first row along the leading bevel surface;
the channels of the first group are longer than the channels of the second group;
the channels of the first group comprise a first portion corresponding to a portion of a first recess and a second portion extending from the first portion away from the leading row;
the channels of the first group are in-phase with the recesses of the first row; and
the channels of the second group are out-of-phase with the recesses of the first row.

10. The blade outer airseal of claim 6 wherein:
the plurality of first recesses are in a pattern along the inner diameter surface; and
the leading bevel surface first channels comprise a first group of channels and a second group of channels:
    the channels of the first group being of different size than the channels of the second group; and the channels of the first group being of different registry with the pattern than are the channels of the second group.

11. The blade outer airseal of claim 8 wherein:
the pattern is a hexagonal array; and
the hexagonal array has a first row along the leading bevel surface.

12. The blade outer airseal of claim 11 wherein:
the ceramic coating comprises a stabilized zirconia.

13. A gas turbine engine including a plurality of blade outer airseals of claim 1 in a circumferential array.

14. The gas turbine engine of claim 13 further comprising:
a blade stage encircled by the circumferential array.

15. The gas turbine engine of claim 13 wherein:
the gas turbine engine has a gaspath; and
for each of the plurality of blade outer airseals, a leading bevel surface is at the first axial end of the body along the gaspath.

16. The gas turbine engine of claim 15 wherein for each of the plurality of blade outer airseals:
a plurality of leading bevel surface first channels are in the leading bevel surface extending from the inner diameter surface; and
the ceramic coating is along the inner diameter surface and the leading bevel surface and in the leading bevel surface first channels.

\* \* \* \* \*